United States Patent
Liu et al.

(10) Patent No.: US 8,127,365 B1
(45) Date of Patent: Feb. 28, 2012

(54) ORIGINATION-BASED CONTENT PROTECTION FOR COMPUTER SYSTEMS

(75) Inventors: Shuosen Robert Liu, Cupertino, CA (US); Jianda Li, San Jose, CA (US)

(73) Assignee: Trend Micro Incorporated, Tokyo (JP)

( * ) Notice: Subject to any disclaimer, the term of this patent is extended or adjusted under 35 U.S.C. 154(b) by 99 days.

(21) Appl. No.: 12/619,472

(22) Filed: Nov. 16, 2009

(51) Int. Cl.
*H04L 29/06* (2006.01)

(52) U.S. Cl. .......................... 726/26; 726/30

(58) Field of Classification Search .............. 726/26; 707/804
See application file for complete search history.

(56) References Cited

U.S. PATENT DOCUMENTS

| | | | |
|---|---|---|---|
| 5,629,980 A * | 5/1997 | Stefik et al. | 705/54 |
| 5,781,550 A | 7/1998 | Templin et al. | |
| 5,884,025 A | 3/1999 | Baehr et al. | |
| 6,401,239 B1 * | 6/2002 | Miron | 717/173 |
| 6,606,744 B1 | 8/2003 | Mikurak | |
| 6,629,081 B1 | 9/2003 | Cornelius et al. | |
| 6,671,818 B1 | 12/2003 | Mikurak | |
| 6,751,600 B1 * | 6/2004 | Wolin | 706/12 |
| 6,963,973 B2 | 11/2005 | Chapman et al. | |
| 6,981,262 B1 * | 12/2005 | DeMello et al. | 726/29 |
| 7,042,470 B2 | 5/2006 | Rhoads et al. | |
| 7,127,741 B2 | 10/2006 | Bandini et al. | |
| 7,131,141 B1 | 10/2006 | Blewett et al. | |
| 7,152,046 B2 | 12/2006 | Wang et al. | |
| 7,298,864 B2 | 11/2007 | Jones | |
| 7,356,188 B2 * | 4/2008 | Venkatesan et al. | 382/229 |
| 7,546,334 B2 * | 6/2009 | Redlich et al. | 709/201 |
| 7,574,449 B2 * | 8/2009 | Majumder | 707/999.102 |
| 7,624,435 B1 | 11/2009 | Huang | |
| 7,886,049 B2 * | 2/2011 | Adelstein et al. | 709/224 |
| 2002/0033844 A1 | 3/2002 | Levy et al. | |
| 2002/0099696 A1 * | 7/2002 | Prince | 707/3 |
| 2003/0005331 A1 | 1/2003 | Williams | |
| 2003/0065944 A1 | 4/2003 | Mao et al. | |
| 2004/0064537 A1 | 4/2004 | Anderson et al. | |
| 2004/0068543 A1 | 4/2004 | Seifert | |
| 2005/0066165 A1 * | 3/2005 | Peled et al. | 713/165 |
| 2005/0138353 A1 | 6/2005 | Spies et al. | |
| 2007/0260872 A1 | 11/2007 | Filipi-Martin et al. | |

* cited by examiner

*Primary Examiner* — Jung Kim
*Assistant Examiner* — Thomas Ho
(74) *Attorney, Agent, or Firm* — Okamoto & Benedicto LLP

(57) ABSTRACT

Content, such as confidential information of an organization, may be protected by automatically categorizing the content. The automatic categorization may be performed by calculating a sensititiy score of the content, the sensitivity score being indicative of whether or not the content is confidential. The sensitivity score may be compared to a threshold. Metadata of the content may be provided to collaborating computers outside the computer network where the content was created. The collaborating computers may compare the metadata to received content to determine if the received content discloses confidential information described by the metadata.

7 Claims, 5 Drawing Sheets

ORIGINATION-BASED CONTENT PROTECTION FOR COMPUTER SYSTEMS

BACKGROUND OF THE INVENTION

1. Field of the Invention

The present invention relates generally to computer security, and more particularly but not exclusively to methods and apparatus for protecting digital content.

2. Description of the Background Art

Various data leakage prevention products are commercially available for protecting confidential information, such as company intellectual property, from unauthorized distribution and access. Generally speaking, data leakage prevention involves classifying content to determine if the content is confidential, and then safeguarding the perimeters of a network to ensure that confidential content is not sent out of the network without required authorization. For example, a company or organization may employ data leakage prevention to restrict access to confidential information and prevent the confidential information from being transmitted outside its enterprise network.

While currently available data leakage prevention techniques are relatively effective, they pose significant usability issues. More specifically, data leakage prevention as currently implemented involves tedious setup and configuration, which are typically manually performed by the user or administrator. For example, to prevent leakage of a confidential document outside an enterprise network, a user may place the confidential document in a designated file server. An administrator manually categorizes the confidential document and selects the confidential document's content sensitivity, access criteria, and protection method. The more document that needs to be protected, the more tedious content protection becomes.

SUMMARY

In one embodiment, content (e.g., confidential information of an organization), may be protected by automatically categorizing the content. The automatic categorization may be performed by calculating a sensititiy score of the content, the sensitivity score being indicative of whether or not the content is confidential. The sensitivity score may be compared to a threshold. Metadata of the content may be provided to collaborating computers outside the computer network where the content was created. The collaborating computers may compare the metadata to received content to determine if the received content discloses confidential information described by the metadata.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
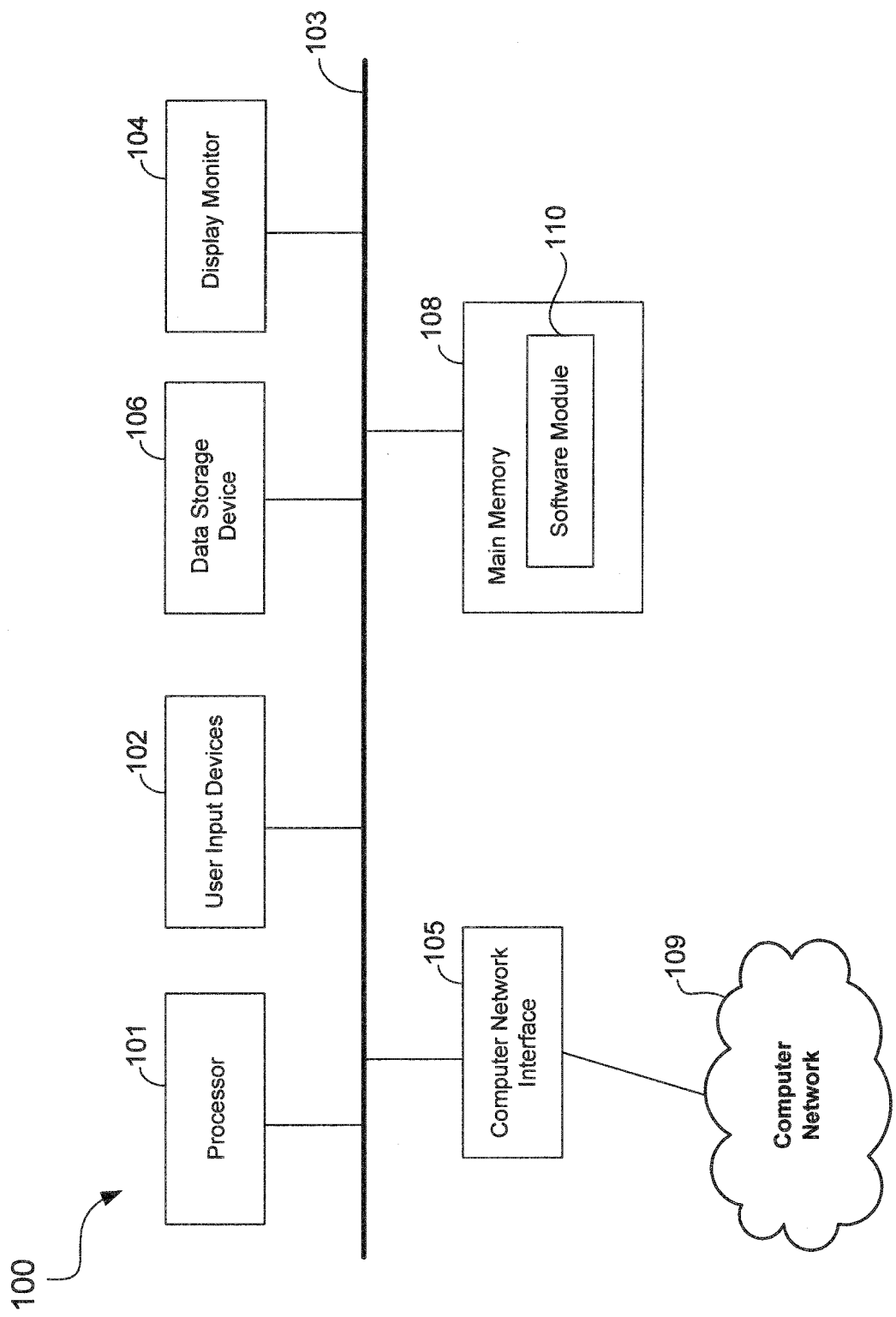
FIG. 1 shows a schematic diagram of a computer in accordance with an embodiment of the present invention.

Referring now to FIG. 1, there is shown a schematic diagram of a computer 100 in accordance with an embodiment of the present invention. The computer 100 may be employed as a client, server, or gateway computer. For example, the computer 100 may be employed as an endpoint computer 230 of FIG. 2. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes software modules 110, which may comprise the later described content protection module 210 or other computer-readable program code. The software modules 110 may be loaded from the data storage device 106 to the main memory 108 for execution by the processor 101.

Figure 2:
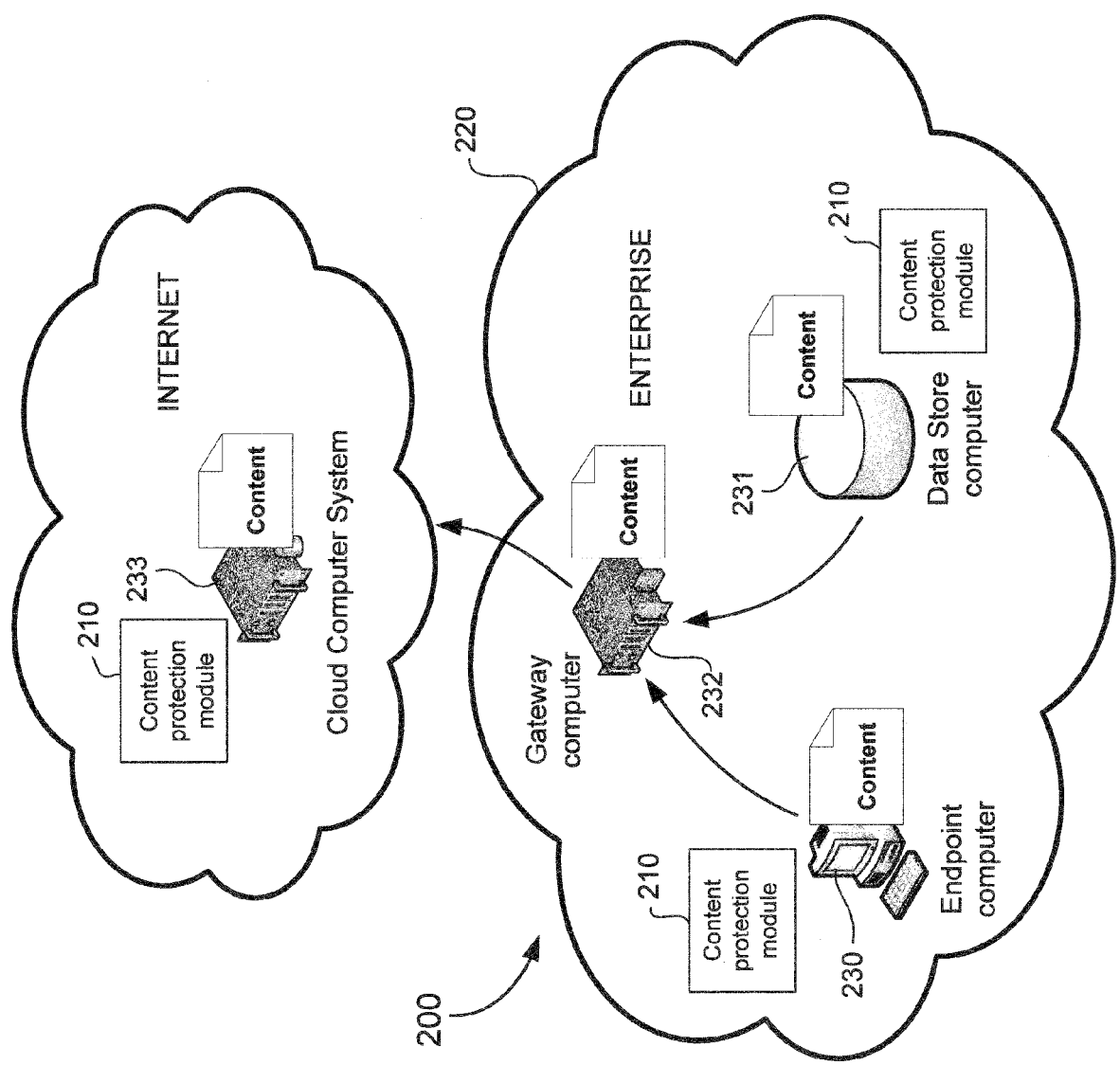
FIG. 2 schematically shows a data leakage prevention system in accordance with an embodiment of the present invention.

FIG. 2 schematically shows a data leakage prevention (DLP) system 200 in accordance with an embodiment of the present invention. In the example of FIG. 2, the DLP system 200 prevents leakage of designated confidential content from the enterprise network 220. The enterprise network 220 may be a private computer network of an organization (e.g., a corporation), and may comprise a data store computer 231, a gateway computer 232, and one or more endpoint computers 230.

An endpoint computer 230 may be a user computer (e.g., desktop, workstation, or laptop computer) for creating content. Content may include word processing files, electronic spreadsheets, source code, project files, presentations, and other forms of computer-created information. The endpoint computer 230 may include a content protection module 210, which may comprise computer-readable program code executed by the processor of the endpoint computer 230. In one embodiment, the content protection module 210 is configured to automatically categorize content for data leakage prevention. The content protection module 210 allows for origination-based content protection in that the categorization of the content may occur at the computer where the content was first created, and automatically upon first creation of the content or before the content is transmitted out of the computer where the content was first created.

As shown in FIG. 2, other computers in the enterprise network 220 or even on the Internet may also run a content protection module 210 to perform automatic categorization of content for data leakage prevention. In the case of the enterprise network 220, the content protection module 210 prevents unauthorized transmission and access of content created at an endpoint computer 230, gateway computer 232, or data store computer 231. The gateway computer 232 may be configured to prevent unauthorized transmission of content that has been categorized by the content protection module 210 as confidential. Similarly, a cloud computer system 233 on the Internet may also run a content protection module 210 to perform automatic categorization of content created in the cloud. The cloud computer system 233 may comprise one or more server computers that provide cloud computing services on the Internet. The cloud computer system 233 may be configured to prevent unauthorized transmission and access of content categorized by the content protection module 210 as confidential.

Figure 3:
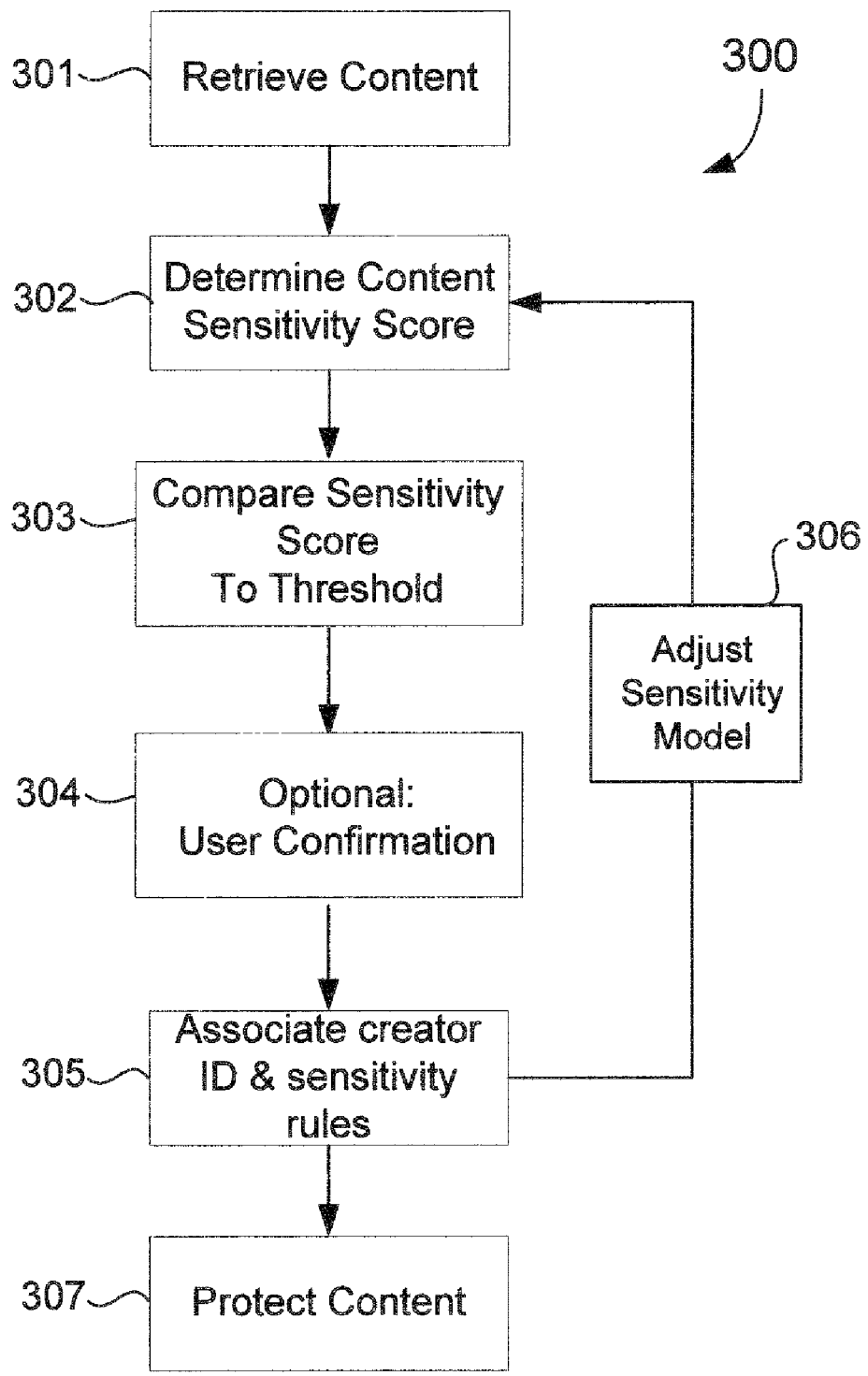
FIG. 3 shows a flow diagram of a method of categorizing content for data leakage prevention in accordance with an embodiment of the present invention.

FIG. 3 shows a flow diagram of a method 300 of categorizing content for data leakage prevention in accordance with an embodiment of the present invention. The method 300 may be performed by a content protection module 210 implemented as computer-readable program code executed by a processor of a computer. For example, the content protection module 210 may be running in the endpoint computer 230 of FIG. 2.

In the example of FIG. 3, the content protection module 210 receives content in the endpoint computer 230 (step 301), where the content was first created by its creator. The content may comprise a computer document, such as a word processing file, for example.

The content protection module 210 determines the sensitivity score of the content (step 302). The sensitivity score is indicative of whether or not the content is confidential and thus needs to be protected from general access. In one embodiment, the content protection module 210 determines the sensitivity score of the content using a sensitivity model that assigns numerical weights based on the content's human creator, type, template, and actual content (e.g., text, body). The sensitivity model may also include rules that add or subtract a numerical value based on existence or non-existence of certain features.

The creator's characteristics may be used to calculate the sensitivity score. For example, the group in which the creator belongs may be given a score depending on the importance and/or confidentiality of the work performed by the group. For example, creators belonging to groups, such as the engineering department, human resources, finance, special project, and other groups or departments, may be assigned predetermined weights based on their group. Information about the content's creator may be obtained by the content protection module 210 from directory services or the content's metadata. The creator's position in the group may also be given weight. For example, a vice president of engineering is more likely to create confidential content compared to director of customer support.

The template used in creating the content may be assigned a weight. For example, a particular Microsoft Word™ document template for creating documents for marketing projects may be assigned a higher weight compared to another Microsoft Word™ document template for creating letters in general. As another example, templates for creating engineering technical specifications may be given one weight, while templates for creating project schedules may be given another.

The content's body or actual content may be parsed for key words, objects, or other content features. Each content feature may be assigned a weight. For example, the name of high priority projects may be assigned more weight compared to the name of lower priority projects. Content features and their weights may also be selected and assigned using a machine-learning approach, based on the features' appearance on samples of known highly confidential documents, for example. Rules, which may be in the form of regular expressions, may add or subtract from the sensitivity score based on existence or non-existence of features, as well as position of features in the content with respect to other features.

The content protection module 210 compares the sensitivity score of the content to a threshold (step 303). Depending on the granularity of the categorization, there may be one or several thresholds, with each threshold assigning a confidentiality level. For example, a first threshold may be for a first level confidential content, a second threshold higher than the first threshold may be a for second level confidential content, and so on. There may also be a single threshold for categorizing content as either confidential or not. If the sensitivity score of the content is higher than a threshold, the content protection module 210 may categorize the content as confidential at a level corresponding to the threshold. Otherwise, if the sensitivity score is lower than the threshold, the content protection module 210 categorizes the content as not confidential.

The method 300 includes an optional step for asking the creator to confirm the accuracy of the content categorization (step 304). After determining the category of the content (e.g., either confidential or not confidential), the content protection module 210 may optionally ask the creator whether or not he or she agrees with the categorization of the content. This optional step allows the sensitivity model to be adjusted over time. For example, if the categorization is incorrect, a report may be generated regarding the incorrect categorization. The administrator or programmer may troubleshoot what caused the incorrect categorization to prevent it from happening again in the future. For example, the weights of the content features may be adjusted to more properly reflect the features' importance in categorizing contents.

In one embodiment, each creator is assigned his or her own unique creator identification (ID). The content protection module 210 may associate the creator ID with the sensitivity rules used to categorize contents made by the creator (step 305). For example, the features found in the content and allowed for correct categorization of the content as confidential may be stored in a database of rules. This enables identification and collection of important features for particular creators, allowing for personalized categorization. The sensitivity model used to determine the sensitivity score may be adjusted based on feedback from the creator (step 306) to further allow for personalized categorization.

The content may be protected based on its category (step 307). For example, non-confidential content may be freely distributed and accessed. Contents that have been categorized as confidential may be marked and protected in accordance with suitable data leakage prevention techniques. For example, the gateway 232 of FIG. 2 may be configured to restrict transmission of confidential documents outside the enterprise network 220, except by authorized users.

As can be appreciated from the foregoing, the content protection module 210 allows for categorization of content without the creator having to go through relatively tedious steps of moving the content to a designated server and waiting for the content to be manually categorized. Also, the content protection module 210 can be adapted for particular users, lowering the chance of incorrect categorization over time.

Figure 4:
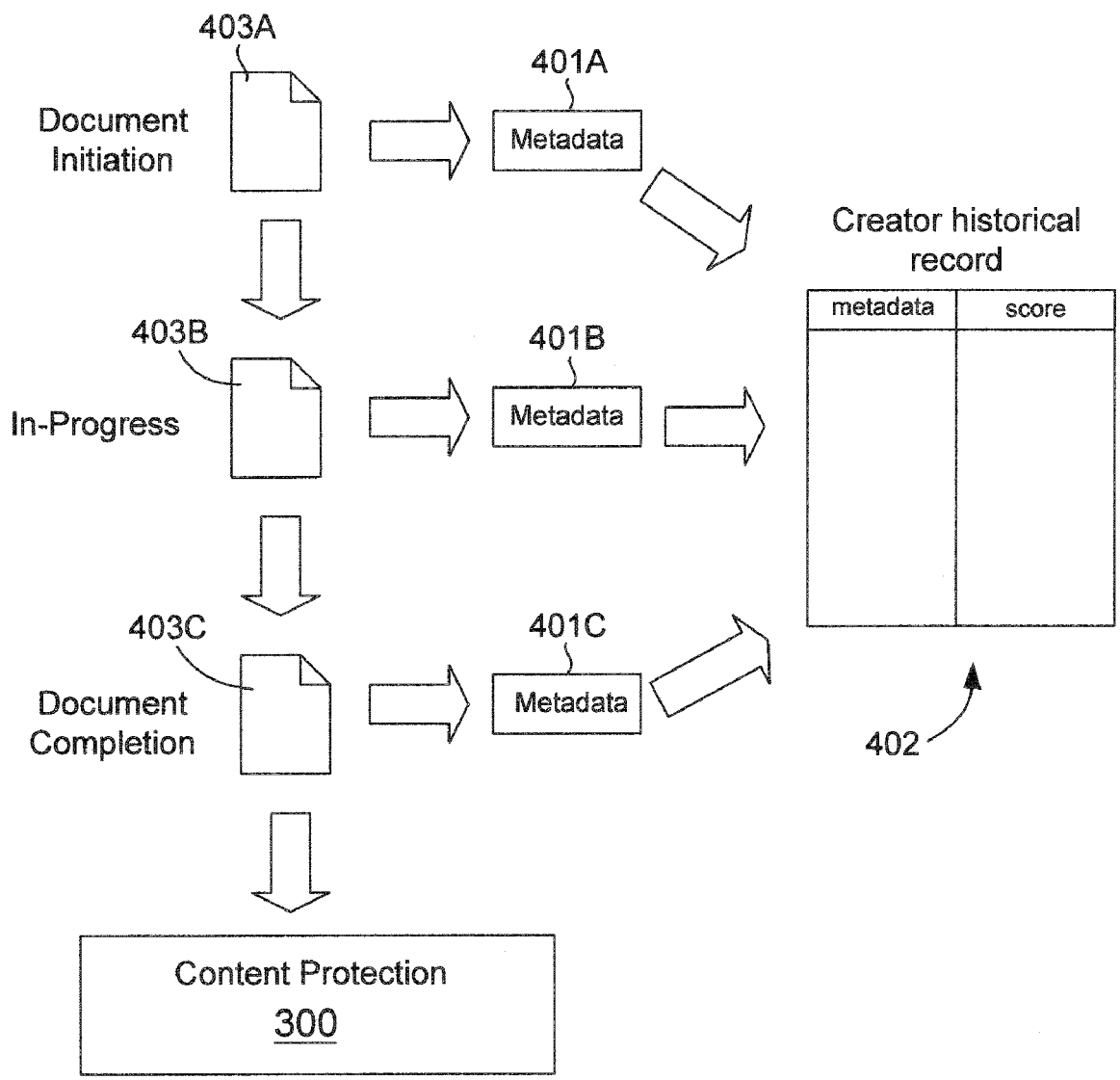
FIG. 4 schematically illustrates the stages of document creation and metadata that the content protection module may generate for the document being created in accordance with an embodiment of the present invention.

FIG. 4 schematically illustrates the stages of document creation and the metadata that the content protection module 210 may generate for the document being created in accordance with an embodiment of the present invention.

In the example of FIG. 4, a document 403 undergoes three phases starting from document initiation, then to work-in-progress, then finally to document completion. The document 403 may comprise a computer document, such as word processing file, pdf document, project file, electronic spreadsheet, source code file, etc. The document 403 is labeled as "403A" when the document is first initiated. This is at time $T_0$ when the creator first started the application program to create the document 403A or when the creator first opened the template on which the document 403A will be based. When the document 403A is first initiated, it may have metadata identifying its creator, summary, when created, and other properties. An example of such metadata includes the properties of a Microsoft Word™ document. The metadata created by the content protection module 210 for the document 403A is labeled in FIG. 4 as "401A." The content protection module 210 may determine the sensitivity score of the metadata 401A as per the step 302 of the method 300, for example. The content protection module 210 adds the metadata 401A and its sensitivity score in the creator's historical record 402, which may identify the creator by his or her creator ID.

The document 403 is labeled as "403B" while it is currently being worked on by its creator. The metadata created by the content protection module 210 for the document 403B is labeled as "401B." The metadata 401B may include an updated metadata 401A and a compact representation of the contents of the document 403B as currently saved by its creator. For example, the metadata 401B may include a hash or normalized version of the body of the document 403B. As a particular example, the metadata 401B may include the text entered by the creator in a word processing program. The content protection module 210 may parse the document 403B for features having weights in the sensitivity model, and include those features in the metadata 401B. The content protection module 210 may determine the sensitivity score of the metadata 401B. The content protection module 210 adds the metadata 401B and its sensitivity score in the creator's historical record 402. The content protection module 210 may store the latest, all, or a subset of versions of the metadata 401B depending on data storage constraints.

The document 403 is labeled as "403C" after it has been completed by its creator to a point where the document may be, for the first time, published out of the computer where the document is created, for example as a first draft. The metadata created by the content protection module 210 for the document 403C is labeled as "401C." The metadata 401C may include an updated metadata 401B and a compact representation of the contents of the document 403C. The metadata 401C is the same as the metadata 401B but for a completed document. The content protection module 210 calculates the sensitivity score of the metadata 401C, and includes the metadata 401C and its sensitivity score in the creator's historical record 402. The document 403C may be categorized as per the method 300 of FIG. 3.

In one embodiment, metadata of categorized content is employed in a collaborative data leakage prevention system involving several computers across the Internet. This aspect of the present invention allows for identification of confidential content even after the confidential content has been transmitted out of the enterprise network or when the content has been converted into another form. This aspect of the present invention is now described with reference to FIG. 5.

Figure 5:
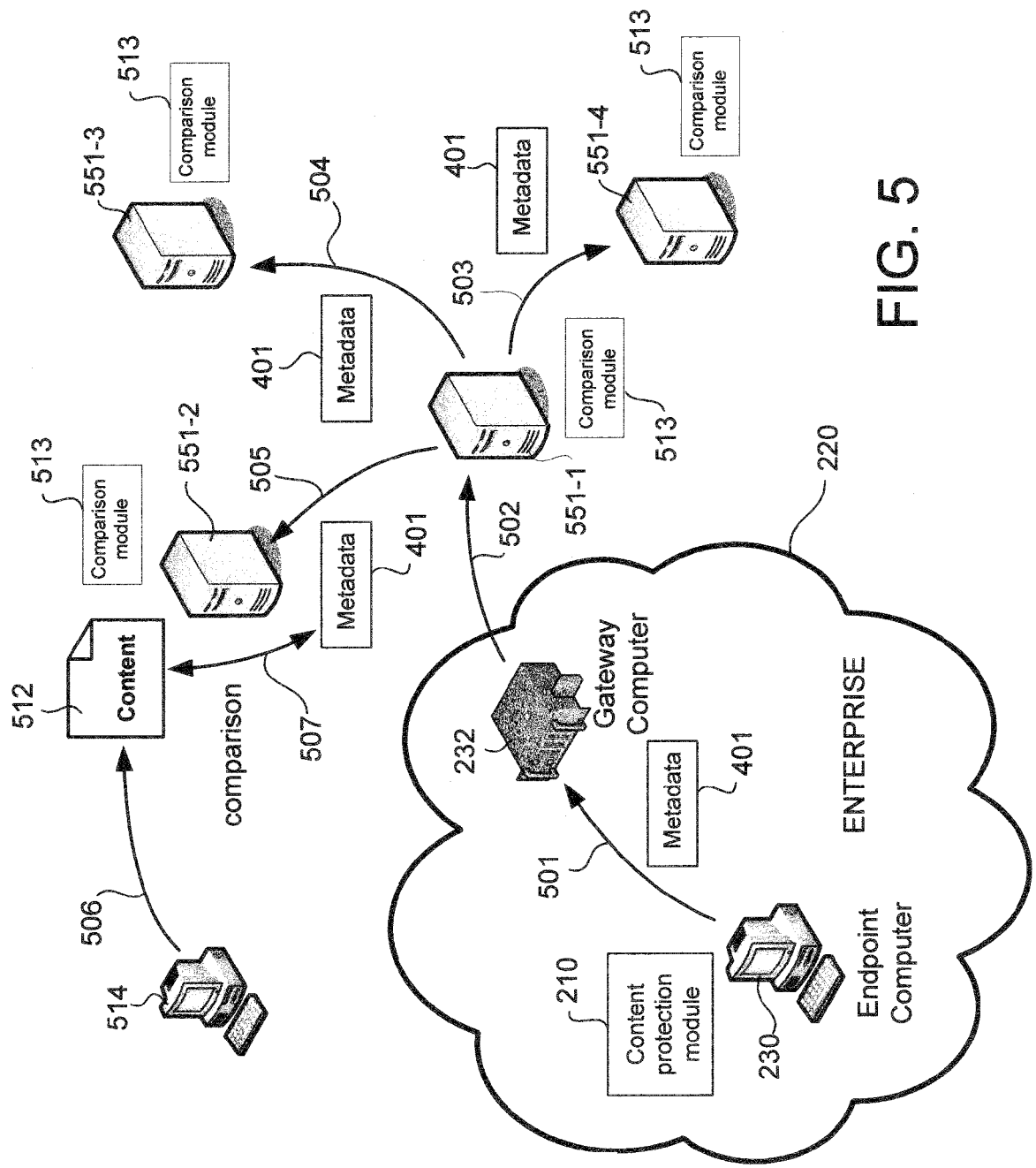
FIG. 5 schematically shows a collaborative data leakage prevention system in accordance with an embodiment of the present invention.

FIG. 5 schematically shows a collaborative data leakage prevention system in accordance with an embodiment of the present invention. The collaborative data leakage prevention system includes a plurality of collaborating server computers 551 (i.e., 551-1, 551-2, . . . 551-n) that are configured to detect confidential content categorized by a protection module 210. The server computers 551 may be configured to provide various web services on the Internet, including e-mail, social networking, blogging, website hosting, Internet service, etc. As will be further discussed below, the server computers 551 are configured to receive metadata of confidential content from content protection modules 210. The metadata may be in the form of a metadata 401 (e.g., 401A, 401B, and/or 401C) or creator historical record 402. The server computers 551 may be configured to watch for content having characteristics of received metadata. The server computers 551 may be operated by the same organization, related organizations, or be bound by agreement or contract to maintain confidentiality of metadata received from the enterprise network 220.

In the example of FIG. 5, the content protection module 210 running on the endpoint computer 230 in the enterprise network 220 sends metadata to the collaborating computer servers 551 by way of the gateway computer 232 (see arrow 501). The metadata is in the form of a metadata 401 (e.g., 401A, 401B, and/or 401C) but may also be in the form of a creator historical record 402. The metadata 401 is sent to a collaborating server computer 551-1, which then sends copies of the metadata 401 to the other collaborating server computers 551 (see arrows 503, 504, and 505). Alternatively, the gateway computer 232 may act as the central distribution point and forward copies of the metadata 401 to all collaborating server computers 551.

Each collaborating server computer 551 may include a comparison module 513 for comparing received content to the metadata 401. A comparison module 513 may comprise computer-readable program code configured to determine if content received in a collaborating computer discloses content described by a reference metadata. For example, the comparison module 513 may be configured to look for combination of words or unique words used in a top secret project as described in the reference metadata. Other suitable matching or detection algorithm may also be used without detracting from the merits of the present invention. In the example of FIG. 5, the reference metadata are those generated by a content protection module 210 for confidential content, such as the metadata 401.

In the example of FIG. 5, a user on a client computer 514 creates content 512 on the collaborating server computer 551-2 (see arrow 506). The content 512 may be a blog, a web posting, or other online content. As can be appreciated, the content 512 does not necessarily have to be in the same format as the metadata 401. For example, the content 512 may be a blog, while the metadata 401 may be metadata for a Microsoft Word™ word processing document. The comparison module 513 running on the collaborating server computer 551-2 determines whether the content 512 is described by the metadata 401 (see arrow 507). If the content 512 is described by the metadata 401, the comparison module 513 deems the content 512 to be disclosing confidential information from the source of the metadata 401. In that case, the comparison module 513 may report the incident to, for example, the gateway computer 232 where an administrator may read and respond to the report.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method to be performed by a computer, the method comprising:
   receiving a document in a first computer where the document is first created by its creator;
   parsing the document;
   calculating a sensitivity score of the document in the first computer based on the content of the document found by the parsing of the document, the sensitivity score being indicative of whether or not the document is confidential; and
   prior to transmitting the document out of the first computer for the first time, categorizing the document as confidential based on a comparison of the sensitivity score to a threshold;
   creating metadata of the document in the first computer;
   forwarding the metadata to a plurality of computers outside an enterprise network in which the first computer belongs; and
   comparing another content received in a second computer to the metadata to determine if the other content contains confidential information included in the document, the other content being publicly accessible over the Internet, the second computer being a computer in the plurality of computers outside the enterprise network.

2. The method of claim 1 further comprising:
   asking the creator to confirm the categorization of the document; and
   adjusting a model for calculating the sensitivity score when the creator indicates that the categorization of the document is incorrect.

3. The method of claim 1 wherein the sensitivity score is based on characteristics of the creator.

4. The method of claim 3 wherein the characteristics include the creator's position in an organization.

5. The method of claim 3 wherein the sensitivity score is based on a template used to create the document.

6. The method of claim 1 wherein the document comprises a word processing file.

7. The method of claim 1 wherein the other content is in a blog posting on the Internet.

* * * * *